United States Patent [19]
Schenk

[11] 3,964,531
[45] June 22, 1976

[54] PANEL INSERT
[75] Inventor: Peter Schenk, West Islip, N.Y.
[73] Assignee: Dzus Fastener Co., Inc., West Islip, N.Y.
[22] Filed: Aug. 14, 1974
[21] Appl. No.: 497,465

Related U.S. Application Data
[60] Continuation-in-part of Ser. No. 374,345, June 28, 1973, abandoned, which is a division of Ser. No. 223,455, Feb. 4, 1972, Pat. No. 3,781,961.

[52] U.S. Cl. ............................... 151/41.7; 52/617
[51] Int. Cl.² ......................................... F16B 39/02
[58] Field of Search ............ 85/68; 151/41.7, 41.73; 52/617

[56] References Cited
UNITED STATES PATENTS

| | | | |
|---|---|---|---|
| 1,829,974 | 11/1931 | Williams | 85/10 F |
| 3,217,363 | 11/1965 | Rohe et al. | 151/41.7 |
| 3,247,754 | 4/1966 | Biesen | 85/68 |
| 3,339,609 | 9/1967 | Cushman | 151/41.7 |

Primary Examiner—Roy D. Frazier
Assistant Examiner—Rodney H. Bonck
Attorney, Agent, or Firm—Kane, Dalsimer, Kane, Sullivan and Kurucz

[57] ABSTRACT

An insert to be mounted in a panel to form a fastener receptacle for interengagement with a fastener element. The insert includes a body portion having a forward end for insertion into the panel and a rear end. A single use cutting surface is on the forward end for forming a recess in the panel to receive the insert. Surfaces on the insert form at least one passageway therethrough in alignment and in communication with the cutting surface and extending to the rear end of the insert for conducting material from the cutting surface to beyond the panel surface when the insert is positioned within a panel. Openings for reception of a potting compound on the insert to retain it in position in the panel. The insert is adapted to be releaseably engaged during the insertion in a panel and then released thereafter. Finally, receiving surfaces are on the insert for interengagement with the fastener element.

7 Claims, 21 Drawing Figures

U.S. Patent June 22, 1976 Sheet 1 of 5 3,964,531
FIG. 1
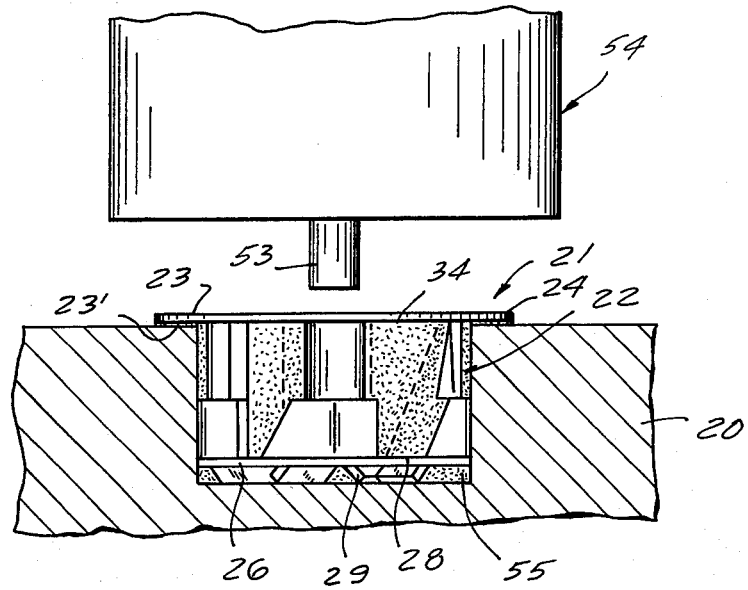
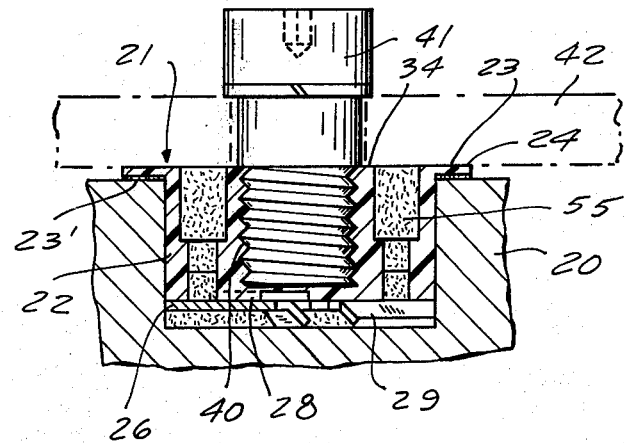
FIG. 2

PANEL INSERT

CROSS REFERENCE TO RELATED APPLICATIONS

This application is a continuation-in-part of previously filed application Ser. No. 374,345, filed June 28, 1973, now abandoned, a division of patent application Ser. No. 223,455, filed Feb. 4, 1972, now U.S. Pat. No. 3,781,961.

BACKGROUND OF THE INVENTION

In construction, particularly in the aircraft industry, it is often necessary to employ lightweight paneling for interior surfaces. This paneling is often somewhat hollow in structure, such as honeycomb in nature, to decrease the weight. Consequently, when it is desired to fasten something to a wall panel, it is often advisable to anchor a receptacle means or insert in the wall panel to receive the fastener member during the fastening operation.

Positioning and anchoring the inserts within the panel is often a time consuming and difficult operation. When considering a very large structure such as an airplane when many, many fasteners are employed, it can be readily seen that positioning of a large number of inserts within the panel walls can be a very time consuming and expensive labor operation during construction. For example, one method of positioning and anchoring the inserts within the panel is to first cut out a round hole in the rather fragile panel with a separate cutting member. The cutting member is then removed and the material which has been cut is plucked out with a pair of tweezers. Thereafter, a two-piece assembly is placed in the hole with adhesive and is held in position with the potting material until it bonds in position and is anchored. The entire operation is done by hand and each separate step must be done for each individual insert. Frequently this requires the time of ten minutes per insert which is clearly undesirable from a time standpoint.

It should also be kept in mind that the various configurations of inserts being employed in the art today do not facilitate the adhering of the insert within the hole in the panel. The prior art configurations and structures render the potting operation somewhat difficult thereby increasing the inefficient and costly time-consuming operations necessitated by the known insert structures.

SUMMARY OF THE INVENTION

With the above thoughts in mind, it is among the primary objectives of this invention to provide an insert which is designed to be mounted in a panel so as to form a fastener receptacle for interengagement with a fastener element. The structure is designed so that the insert includes its own single use cutting surface and has surfaces forming appropriate passageways so that as the cutting surface and the remainder of the insert are directed into the panel in a cutting action the material removed passes through the passageways in the insert and out the rear surface thereof for removal. Thereafter, once the insert is fully positioned within the panel, passageways are present to permit potting compound to enter and engage surfaces of the insert and surrounding panel surfaces to fix the insert in position. The result is an insert that can be positioned in a panel in a quick and efficient manner thereby greatly decreasing labor costs.

In summary, the insert is adapted to be mounted in the panel to form a fastener receptacle for interengagement with a fastener element. It includes a body portion having a forward end for insertion into the panel and a rear end. A single use cutting surface is on the forward end for forming a recess in the panel to receive the insert when a predetermined force is applied to the insert in order to position the insert through a substantial cross section of the panel without the necessity of pre-forming the recess. Surfaces forming at least one passageway through the insert are in alignment and in communication with the cutting surface and extend to the rear end of the insert for conducting material from the cutting surface to beyond the panel surface when the insert is positioned within the panel. Surfaces are on the insert forming openings to receive a potting compound while the insert is positioned in the recess to mount the insert therein. Means are on the insert adapted to be releaseably engaged by insertion means so that the insert may be held in a desired manner during insertion and fastening in the panel and then released thereafter prior to assembly with the fastened assembly. Finally, receiving surfaces are on the insert adapted for interengagement with the fastener element.

With the above objectives, among others, in mind, reference is had to the attached drawings.

BRIEF DESCRIPTION OF THE DRAWINGS

In the drawings:

FIG. 1 is a sectional elevation view of the insert in position in a panel;

FIG. 2 is a sectional elevation view thereof with a fastener element inserted therein;

DESCRIPTION OF THE PREFERRED EMBODIMENTS

Figure 3:
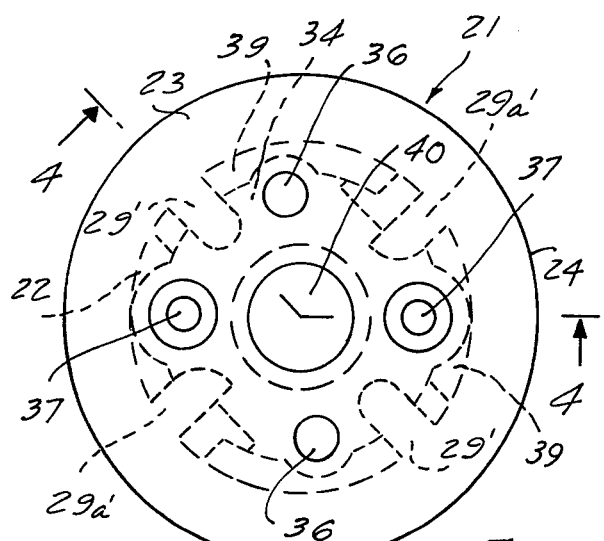
FIG. 3 is a top plan view of the insert body of the invention with a washer connected thereto.
Figure 4:
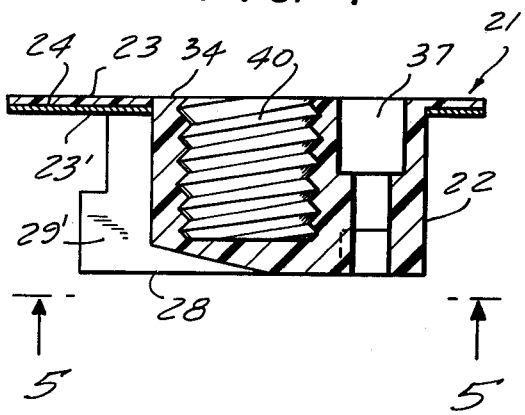
FIG. 4 is a sectional elevation view thereof taken along the plane of line 4—4 of FIG. 3.
Figure 5:
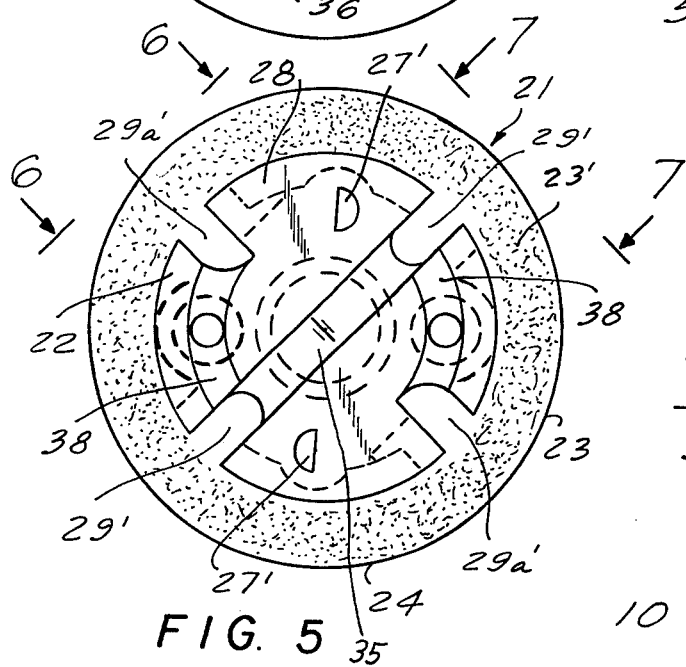
FIG. 5 is a bottom plan view thereof taken along the plane of line 5—5 of FIG. 4.
Figure 8:
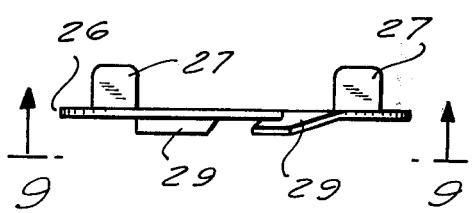
FIG. 8 is a side elevation view of the cutter blade portion of the insert.
Figure 9:
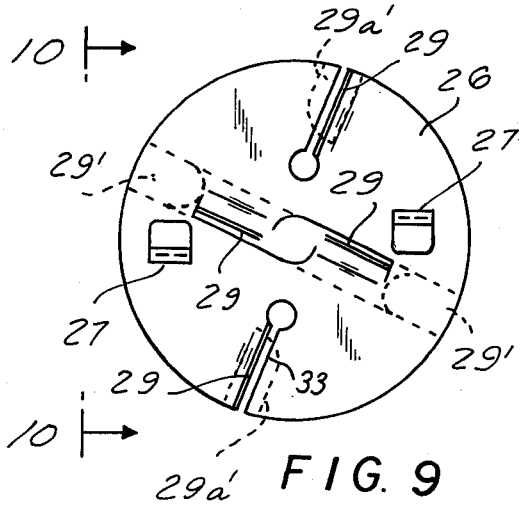
FIG. 9 is a bottom plan view of the insert taken along the plane of line 9—9 of FIG. 8.
Figure 10:
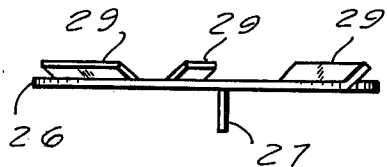
FIG. 10 is an end elevation view of the cutter blade portion of the insert taken along the plane of line 10—10 of FIG. 9.

In FIGS. 1 and 2 an insert 21 is shown in position in a panel 20 and in FIGS. 3–10 it is shown in component form. Insert 21 includes a body portion 22 which may be constructed of a nylon material or any other convenient rigid plastic material. On the upper surface of insert body portion 22 is a washer 23 which is of a greater diameter than the cylindrically shaped body portion 22. In this manner, annular flange 24 is provided for engagement between the washer and panel 20 upon insertion of insert 21 within panel 20. Washer 23 is molded as one piece with body 22. Alternatively, the washer may be independent of the insert until the potting step at which time the potting compound will bond the washer to the insert and panel as well as bonding the insert to the panel. In the embodiment shown, a common type of hot melt adhesive 23' is on the underside of washer 23. The heat generated in positioning in the insert is sufficient to melt the adhesive to permit it to bond the washer to the outer surface of panel 20.

Mounted on the lower surface of insert 21 is a drilling plate or cutting blade 26. Cutter plate 26 has a pair of outstanding projections 27 which extend into appropriate recesses 27' in the undersurface 28 of body 22 to hold plate 26 in proper position with respect to insert body 22. On the undersurface of plate 26 at 90° intervals are four cutting blades 29 which serve to displace the material within the panel as the insert is rotated thereby cutting a hole for the insert. The blades are divided into an inner aligned pair and an outer aligned pair perpendicularly disposed with respect to the inner pair. The outer diameter of plate 26 is substantially the same as the outer diameter of the undersurface 28 of insert body 22. Cutting plate 26 is of a rigid and inexpensive material, for example, a metal such as steel which permits it to form the necessary cutting surface while retaining disposability so that the insert and cutting blade combination is designed for single use. The cutter 26 is designed to remain in the panel along with body portion 22 when the insert has been properly positioned for use.

About the circumference of body portion 22 at spaced intervals in alignment with the cutting edges 29 are four peripheral recesses 29'. The recesses are formed by a combination of an arcuate cut-out terminating in one straight wall 30 on one side and a combination of a beveled wall 31 and a straight wall 32 on the other side. The beveled surface facilitates passage of material being cut from the panel. The material passes through openings 33 at the location of the cutting blades. The material passes directly through the openings 33 and guided by the surfaces forming cut-outs 29 toward the rear edge 34 of the insert body 22. In this manner, the insert can be mounted within the panel in the drilling step. There is no need to initially drill a hole in the panel and remove the material and then place the insert in position. The material can pass through appropriate openings in the washer for removal or since the recesses are open radially, the material can pass therefrom when it reaches the upper edge of the panel during the insertion process prior to engagement between the panel surface and the flange of the washer. The number of cutting blades 29 and appropriate recesses 29' for a particular insert body is a matter of choice. In the embodiment depicted, there are four aligned blades 29 and recesses 29'.

It should also be noted that successive cut-outs 29' are of slightly different configuration. However, both types of recesses 29' are formed by a combination of an arcuate cut-out terminating in straight edges and beveled surfaces. The difference in configuration is due to molding requirements and location of material for forming the desired apertures in the rear surface 34 of the insert as will be discussed in detail below.

Figure 6:
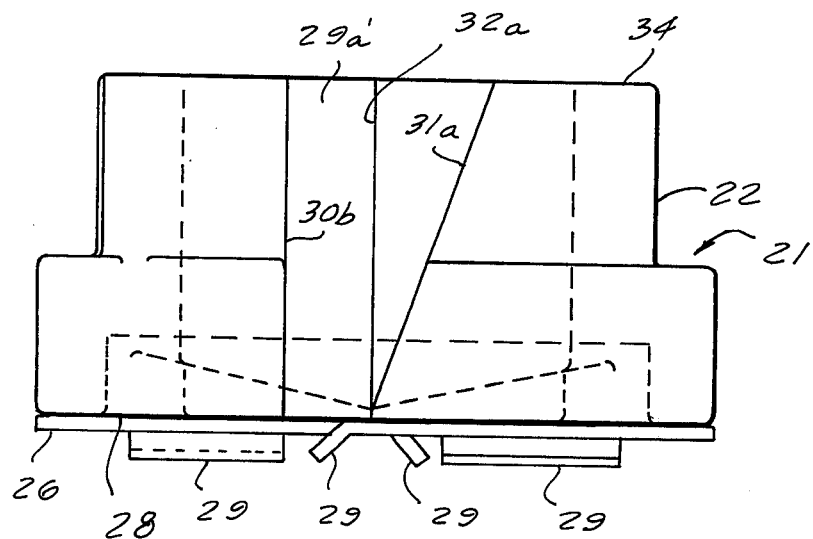
FIG. 6 is a side elevation view of the insert taken along the plane of line 6—6 of FIG. 5.
Figure 7:
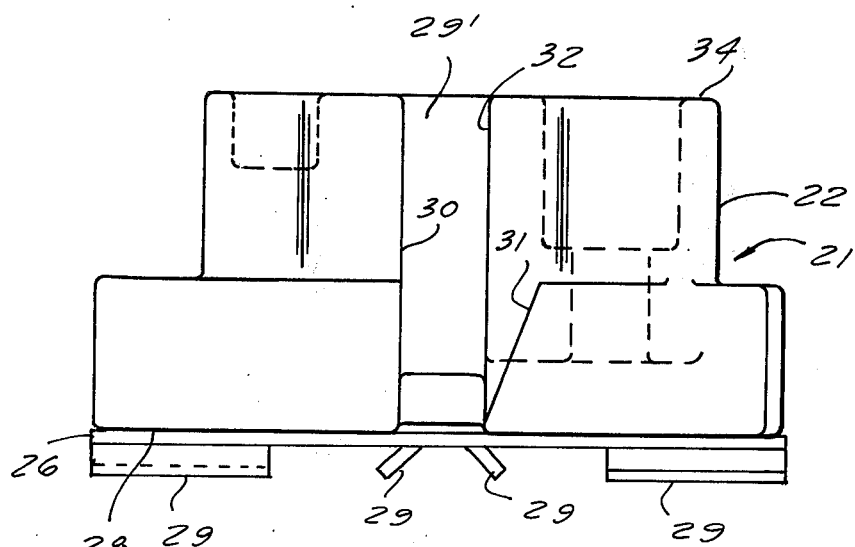
FIG. 7 is a side elevation view of the insert taken along the plane of line 7—7 of FIG. 5.
Figure 11:
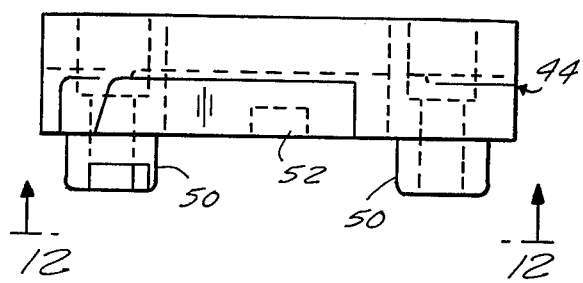
FIG. 11 is a side elevation view of the body portion of an alternate embodiment of an insert of the invention.
Figure 13:
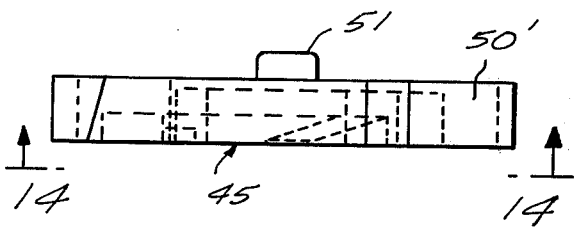
FIG. 13 is a side elevation view of the nut retainer portion of the alternate embodiment.
Figure 12:
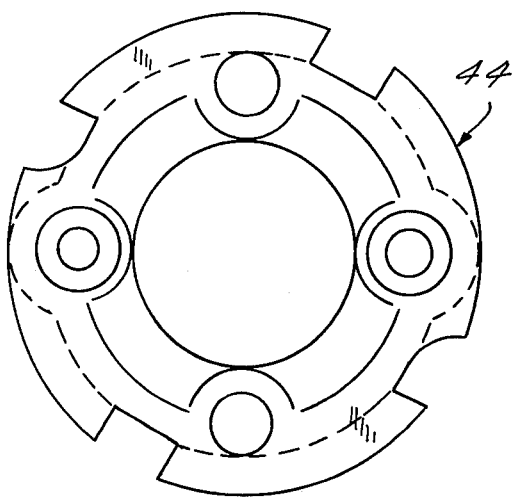
FIG. 12 is a bottom view thereof taken along the plane of line 12—12 of FIG. 11.
Figure 14:
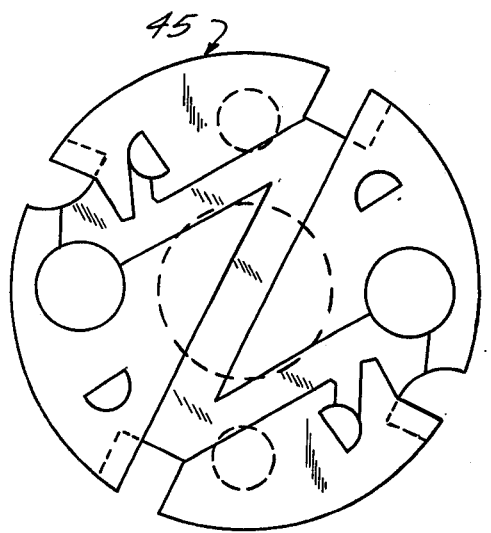
FIG. 14 is a bottom view thereof taken along the plane of line 14—14 of FIG. 13.
Figure 15:
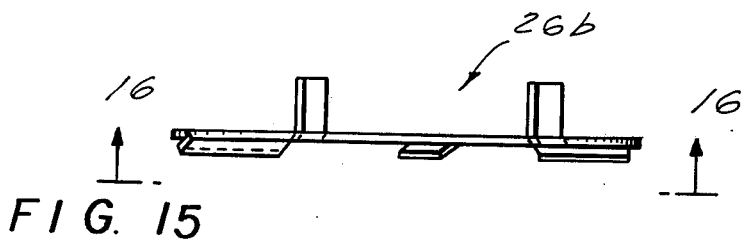
FIG. 15 is a side elevation view of a cutter blade for attachment to the alternate embodiment.
Figure 16:
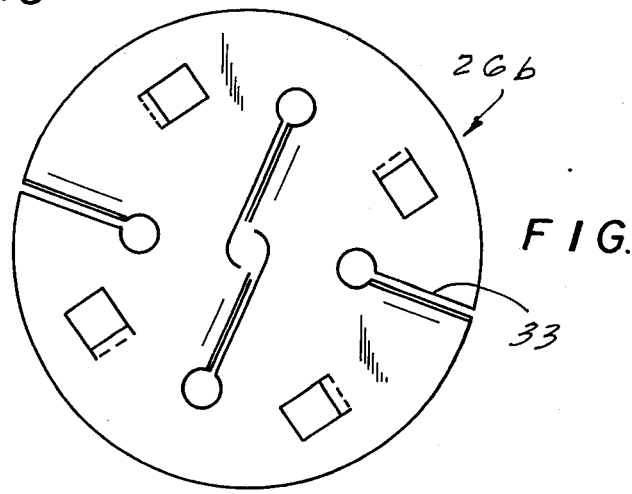
FIG. 16 is a bottom view thereof taken along the plane of line 16—16 of FIG. 15.
Figure 17:
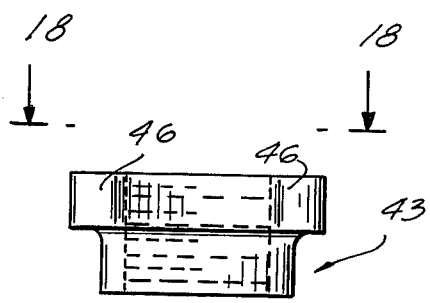
FIG. 17 is a side elevation view of the nut portion of the alternate embodiment.
Figure 18:
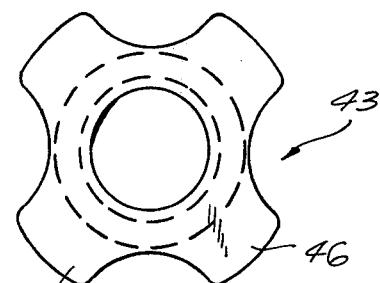
FIG. 18 is a top view thereof taken along the plane of line 18—18 of FIG. 17.
Figure 19:
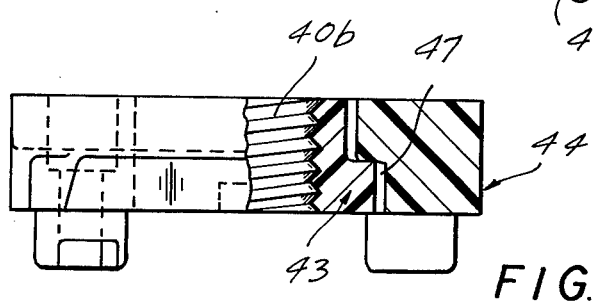
FIG. 19 is a partially sectional side elevation view of the insert body and nut portion of the alternate embodiment.

The cut-out depicted in FIG. 6 is designated with the same numerals as the cut-out in FIG. 7, but due to the differences in surface structure similar components have been renumbered with the addition of subscript $a$. The surfaces function in the same fashion and in the embodiment shown a pair of recesses 29a' are diametrically located on the insert body and a pair of recesses 29' are diametrically located on insert body 22.

Also cooperating with the cut-outs 29' is a slot 35 extending diametrically across the undersurface of insert body 22. The slot is in communication with recesses 29' and assist in directing material passing from the aligned inner pair of cutting blades 29 through cutter 26 into recesses 29' and to beyond the rear surface 34 of insert body 22.

On the upper surface 34 of insert body 22 are a pair of opposed openings 36 which are adapted to be engaged by corresponding projections of a washer to facilitate proper alignment and interengagement of the washer and insert during handling. A pair of larger openings 37 are also positioned on upper surface 34 of insert body 22 and extend through the entire body section of insert body 22. Openings 36 are engaged by pins during the positioning and sealing of the insert in panel 20. Potting material is injected into openings 37 through pins in the apparatus used for the purpose of fastening insert 21 within panel 20 after it has been properly positioned therein. The washer has appropriate openings therein to permit access to the appropriate openings in the insert body.

A series of spaced cut-outs 38 are located in the undersurface of insert body 22 and communicate with adjacent cut-outs 29' and 29a'. Openings 37 are open to cut-outs 38. The result is a network of passageways including cut-outs 38, slot 35 and recesses 29' and 29a' which facilitate removal of material cut from the panel during insertion of the insert and also facilitate the introduction of potting compound to bond the insert in position within the panel thereafter. It will also be noted that the configuration of cut-outs 29a' and 29' are such that a plurality of shoulders 39 are formed about the surface of insert body 22 between the forward edge 28 and rear edge 34. Shoulders 39 form engaging surfaces for the potting compound and assist the potting compound in retaining insert 21 in position within the panel 20.

Insert body 22 has a central threaded bore 40 to receive a fastener element 41 when insert 21 is used to lock two panel members together. Although a threaded interengagement is depicted, other common types of fastener engagement can be utilized equally as well. As depicted in FIG. 2, once insert 21 is positioned properly in panel 20 and the potting compound is located therein to hold the insert in position, a second panel 42 can be aligned with panel 20 so that fastener 41 can pass through an opening in panel 42 and interengage with insert 21 and thereby hold panels 20 and 42 together.

An alternative embodiment for the insert is depicted as insert 21b in FIGS. 11–21. In some instances, it is desirable to have movement of the threaded central opening in the insert to facilitate its engagement with the fastener element. Therefore, the object of the alternate embodiment depicting insert 21b is to have a central member including the threaded central opening 40b which is movable within the remainder of the insert in a floating manner so that it can be easily engaged with the fastener element. Insert 21b has a drilling plate or member 26b which is substantially the same as member 26 in the previously discussed embodiment. Additionally, it is held in position with respect to the undersurface of the insert in the same manner as in the previously discussed embodiment. The interconnected passageways for the potting compound and for removal of material during drilling and positioning of the insert are substantially the same as well as the openings for engagement with the positioning apparatus.

As previously stated, the difference lies in the provision of a floating or movable insert nut 43 which is caged in position within the insert and which facilitates engagement with the fastener member. Nut 43 is caged by means of retention by a body portion 44 in cooperation with a retainer portion 45. Floating nut 43 includes a number of spaced prongs 46, the upper surface of which are engaged by a shoulder 47 on body portion 44. The undersurface of prongs 46 are engaged by retainer member 45. The retainer member and body member are interengaged in a conventional manner to cage nut 43 between the body and retainer portions. The resultant opening formed by the engagement of body portion 44 and retainer 45 is somewhat larger than the outer dimensions of nut 43. This permits movement of nut 43 to a predetermined degree while still retaining the nut in caged position. Rotational movement of nut 43 is restricted by interengagement between the side walls of prongs 46 and inwardly projecting arcuate shoulders 48 spaced about body 44. As shown, limited rotational movement is permitted to assist in providing the floating action for nut 43 but each prong 46 is caged so that an attempt to rotate the nut beyond the limited degree will bring prongs 46 into engagement with prongs 48. Therefore, when a fastener element is threaded through the central opening 49 in nut 43 rotation of the fastener with respect to the nut will be permitted with the nut prongs 46 in interengagement with shoulders 48. Similarly, disengagement permits the removal of the fastener element from threaded interengagement with nut 43.

The positioning of insert 21b within a panel 20 is the same as in respect to the originally discussed embodiment of insert 21.

Figure 20:
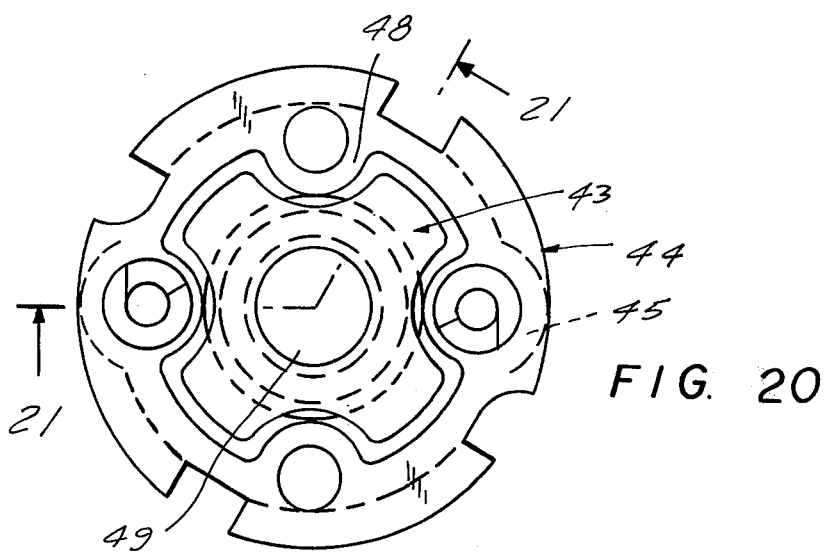
FIG. 20 is a top plan view thereof.
Figure 21:
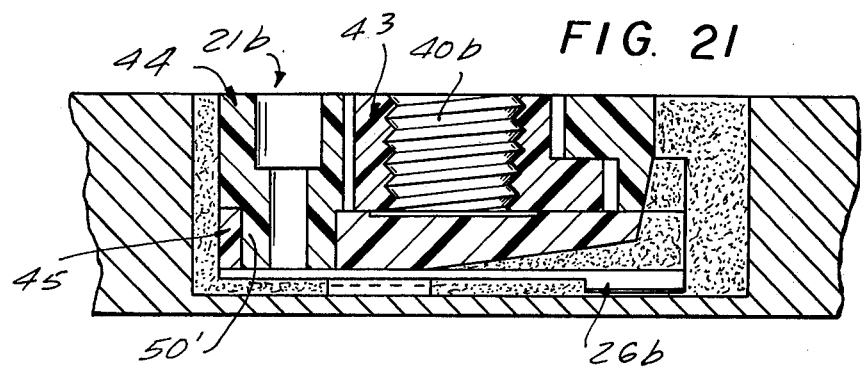
FIG. 21 is a sectional view of the alternate embodiment taken along the plane of line 21—21 of FIG. 20 and showing the alternate embodiment inserted in a panel.

Retainer member 45 is interengaged with body member 44 as depicted in FIGS. 20 and 21. A pair of projections 50 extend outwardly from body 44 and enter into appropriate recesses in retainer 45. Additionally, an upward projection 51 on retainer 45 is positioned so as to enter an appropriate recess 52 in body 44.

Interengagement of these portions of insert 21b is sufficient to cage nut 43 within the resultant chamber formed by retainer 45 and body 44 in interengagement. If desired, additional conventional fastening means can be utilized to hold the retainer and body together such as adhesive or screws.

In operation, insert 21 or 21b whichever is to be utilized with washer on its upper surface and a drilling plate 26 on its lower surface is manually interengaged with receiving pins 53 of an apparatus 54 for mounting the insert in panel 20. An example of an apparatus satisfactory for this purpose appears in U.S. Pat. No. 3,781,961. The pins 53 are positioned in openings 37 of the insert. As discussed above, the washer is fastened to the top surface of insert body 22 by means of extensions on the washer which extends downwardly into appropriate openings in the insert or is integrally molded therewith. The insert is then positioned with cutting blade 26 in engagement with the exposed surface of panel 20. Apparatus 54 is then operated to rotate insert 21 which causes cutting blades 29 of driving plate 26 to cut downwardly into panel 20. The cutting action continues until insert 21 is at the desired depth in panel 20 with washer 23 in engagement with the outer panel surface. During the positioning action, material cut from the panel passes through the network of passageways in alignment with the cutting blades and terminating at the rear end of slots or recesses 29a' and 29a until the material is free of the panel surface.

Potting compound is then projected through appropriate openings in the washer and aligned openings 37 at the rear end of the insert until it travels through the interconnected passage network and engages with surfaces on insert 22 and the surrounding surfaces of panel 20 to rigidly fix the insert within the panel. Apparatus 54 is then removed from engagement with the insert and the insert is ready to receive a fastener 41. Dispersion and location of the potting compound 55 is depicted in particular in FIGS. 1 and 2. It will be noted how the potting compound, through the passage network around the insert 21, is able to interengage with a large surface area of the insert and surrounding panel surfaces. When the potting compound hardens it will then hold the insert in fixed rigid position within the panel. Fastener element 41 is then passed through an opening in a second panel 42 and threadedly interengage with the central opening 40 in the insert 21 to hold panel 42 in tight interengagement with panel 20.

Insert 21b is handled in the same manner as insert 21 when it is positioned within a panel for use. All of the insert embodiments are self-cutting to eliminate the necessity of a two-step operation. The insert cuts as it is being inserted thereby providing a great time saving and cost saving advantage. An inexpensive metal cutting surface on the penetrating side of the plastic insert facilitates its use in cutting a hole for the insert in a tough material such as fiberglass as well as in other commonly used material.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A small insert adapted for single use to be mounted in a thin lightweight panel of low density core material to form a fastener receptacle for interengagement with a fastener element comprising:

a body portion having a forward end for insertion into the panel and a rear end;

a single use cutting surface on the forward end for forming a recess in the panel to receive the insert when a predetermined force is applied to the insert in order to position the insert through a substantial cross section of the panel without the necessity of preforming the recess;

surfaces forming at least one passageway through the insert in alignment and in communication with the cutting surface and extending to the rear end of the inset for conducting material removed from the panel in forming the recess from the cutting surface to beyond the panel surface independent of other forces when the insert is positioned within the panel so as to permit the recess to be formed as the insert is simultaneoulsy positioned in the panel;

the surfaces forming at least one passageway including a beveled portion to facilitate guidance and removal of material from the insert end panel without the necessity of the application of additional force while the predetermined force is being applied to the insert to position the insert in the panel;

surfaces on the insert forming openings to receive a potting compound while the insert is positioned in the recess to mount the insert therein;

means on the insert adapted to be releasably engaged by insertion means so that the insert may be held in the desired manner during insertion and fastening in the panel and then released thereafter prior to assembly with the fastened element; and receiving surfaces on the insert adapted for interengagement with the fastener element.

2. The invention in accordance with claim 1 wherein the cutting surface is circular in configuration and has a plurality of spaced cutters projecting from the undersurface thereof for facilitating engagement with the material of the panel and the cutting of the panel material during formation of the recess, the passageways on the insert for conducting the cut material from the panel include a plurality of tapered openings about the circumference of the body of the insert in alignment with the projecting cutters so that the cut material is directed through the tapered openings to the rear end of the insert.

3. The invention in accordance with claim 1 wherein the body portion of the insert is of a plastic material and the cutting surface is formed by a metal cutting blade mounted to the forward end of the plastic body portion in fixed position with respect thereto.

4. The invention in accordance with claim 1 wherein the body of the insert includes a plurality of spaced radially extending shoulders in position for engagement with the potting compound thereby facilitating the retention of the insert by the potting compound within the recess of the panel.

5. The invention in accordance with claim 1 wherein the receiving surfaces on the insert body form a central threaded hole open at the rear end of the insert and adapted to receive a threaded fastener element therein in threaded interengagement, and the means for releasable engagement with the insertion means include two diametrically opposed holes in the body of the insert open at the rear end thereof.

6. The invention in accordance with claim 1 wherein a peripheral flange extends laterally from the rear end of the insert and attachment means is on the flange in position for engagement with the panel when the insert is inserted therein so as to retain the insert in position until the potting compound has been inserted therein and sets to retain the insert in the panel.

7. The invention in accordance with claim 6 wherein the attachment means is a hot-melt adhesive located on the under side of the flange and adapted to be melted by the heat generated in positioning the insert in the panel so as to bond the insert to the panel prior to introduction and setting of the potting material.

* * * * *